United States Patent Office 2,979,791
Patented Apr. 18, 1961

2,979,791
MOLDS AND METHODS OF FORMING

John W. North, Decatur, Ga., assignor, by mesne assignments, to Glasrock Products, Inc., Atlanta, Ga., a corporation of Georgia No Drawing. Filed May 25, 1955, Ser. No. 511,129

3 Claims. (Cl. 22—193)

This invention relates to molds and methods of forming and using the same, and is particularly concerned with molds for the casting of articles from molten metal and to a mold material and the method by which such mold is formed and employed.

Current practice for the casting of molten metal is to provide a mold formed within a flask by the use of sand or like siliceous materials in which may be incorporated suitable binding agents so that the cavity into which the molten metal is to be poured may be formed by a forming or molding of the mold material. The formation of such cavities requires the work of an expert and considerable time is required as well as the practice of the skill accumulated from long experience in forming a cavity corresponding to the shape of the article which is to be formed. Such molds are frequently formed in two parts, complementary cavities or recesses in the abutting faces of such parts being matched to provide the complete cavity. Ports or gates lead into such cavities through which the molten material is delivered, and vents are provided through which excess material may be exuded and from which gases may be expelled from the molten material as it cools. It will of course be understood that both the formation of the mold and the assembly thereof, as well as the pouring operation and the removal of the finished article with its attached sprues formed by the gates and the vents, is an expensive and time consuming process. Applicant has discovered that certain newly developed materials readily lend themselves to new use as mold material and that such materials are amenable to the formation of a suitable mold cavity therein by simple compression of a prototype of the article to be cast by pressing the same into the surface of the mold.

While the cavity may be conveniently formed in this manner, it will further be understood that this material readily lends itself to working by hand or machine tools and the invention thus embraces such forming of the cavity.

It is therefore among the primary objects of the present invention to provide a new and improved mold material.

Another object of the invention is to provide a new and improved mold material in which a mold cavity may be formed by the application thereto with pressure of a prototype of the article to be cast.

Another object of the present invention is to provide a mold material comprising a siliceous foam block, the cell structure of which may be broken down by pressure to conform with an article, when such article is pressed thereagainst.

Another object of the present invention is to provide a mold material comprising a siliceous foam block, the cell structure of which may be broken down to conform to the shape of the article to be molded by the use of suitable hand or machine tools.

It is also an object of the present invention to provide the novel method of mold forming which includes the step of providing a body of deformable heat resistance material such as a foamed siliceous substance and depressing therein a prototype of the article to be cast.

It is also an object of the present invention to provide a casting method which includes the step of forming a depression within a cellular siliceous foam block, coating the depression thus formed by an impervious material adapted to seal and fill the pores of the material adjacent the cavity thus formed and applying molten metal thereto so as to form the desired casting.

Recent developments in the foaming of materials has provided a cellular rigid substance having frangible cells. One of such products is now commercially available and is in present day use as an insulating material. Such material has high heat resistance and an extremely low coefficient of expansion while, at the same time, the cellular structure thereof is readily broken by the application of pressure. Such material is therefore ideal from the standpoint of heat resistance and expansion coefficient for use as a mold, and the slight resistance thereof to pressure provides for the ready formation therein of an impression by the mere application thereto of a prototype of the configuration to be cast or to shaping by suitable tools to obtain the configuration of the article to be molded.

In carrying out the present invention, a suitable block of this rigid silica foam is provided and a recess is formed therein to conform with the shape of the casting desired. While the invention is not so limited, it is however within the scope of invention to provide for the formation of the cavity by the application to the surface of the siliceous foam of the article to be cast or a prototype thereof. In practice, it has been found that by simply placing the article on the surface of the siliceous foam block and by application of pressure thereto, the thin wall sections of the cellular material will be broken to form a cavity closely conforming to the size, shape and general contour of the article to be formed.

While the present invention may be carried out by simply applying the prototype under pressure to the surface of the siliceous foam block, it has been found that more close adherence to the size and configuration of the casting to the prototype may be achieved by the application to the cavity of a heat resistant clay paste or like substance which will coat the open pore cavities which have been broken into by the impression on the surface thereof of the prototype of the article or which have been broken into by carving or otherwise forming the desired cavity. By thus coating the walls of the cavity, a smooth liner is provided for the cavity of the otherwise irregular surface formed by the impression of the prototype of the article.

In carrying out the method, a prototype of the article may be disposed between two confronting blocks and pressure thereof will form companion recesses in the confronting faces of the block which may thereafter be separated, the prototype removed, the cavity lined or otherwise coated as in the manner suggested and suitable gates, vents and the like may be readily formed in convenient manner by simple pressure through, of an object of the shape conforming with such gates and vents. Thereafter, the blocks may be reunited and molten metal may be deposited within the cavity through the gates thus formed and fumes or excess material may be exuded from the cavity through the vents as in the normal present day casting of molten metal.

Since the material herein suggested is of high heat insulating quality as well as of high resistance, it will be seen that not only will be mold thus formed withstand casting temperatures, but manipulation of the mold will be convenient because of the low heat conductivity of the material. Since the material has a low coefficient of expansion, it will be seen that expansion or contraction of the mold material will be at a minimum and thus such material lends itself to the casting of a desired form closely corresponding in dimensions to that of the prototype used in the formation of the cavity.

While the present invention contemplates the use of foamed silica, it will be understood of course that the invention is not limited to this specific foam material. Other highly resistant cellular materials of foam-like or sponge-like nature which are rigid but yieldable upon pressure to break the material of the cells will adequately serve the purpose and carry out the present inventive concept. Therefore, it will be understood that in the practice of the invention, numerous changes, modifications and the full use of equivalents may be resorted to without departure from the spirit and scope thereof as outlined in the appended claims.

I claim:

1. The method of forming a casting mold which includes the step of forming a casting cavity in a block of foamed siliceous material by pressure thereagainst of a prototype of the article to be formed.

2. The method of forming a casting mold which includes the step of forming a casting cavity in a block of foamed siliceous material by the pressure thereagainst of a prototype of the article to be formed, and lining said cavity with a coating material.

3. The method of forming a casting mold which includes the step of forming a casting cavity in a block of foamed siliceous material by the pressure thereagainst of a prototype of the article to be formed, and lining said cavity with coating material comprising a clay paste.

References Cited in the file of this patent

UNITED STATES PATENTS

| | | |
|---|---|---|
| 134,685 | Levallois | Jan. 7, 1873 |
| 153,084 | Joyce | July 14, 1874 |
| 1,325,725 | Kohler et al. | Dec. 23, 1919 |
| 2,322,667 | Seastone et al. | June 22, 1943 |
| 2,586,814 | Greenewald | Feb. 26, 1952 |

FOREIGN PATENTS

| | | |
|---|---|---|
| 742,395 | Germany | Dec. 1, 1943 |